(12) United States Patent
Cho

(10) Patent No.: US 7,269,712 B2
(45) Date of Patent: Sep. 11, 2007

(54) THREAD SELECTION FOR FETCHING INSTRUCTIONS FOR PIPELINE MULTI-THREADED PROCESSOR

(75) Inventor: Jang-Ho Cho, Yongin (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 263 days.

(21) Appl. No.: 10/754,550

(22) Filed: Jan. 12, 2004

(65) Prior Publication Data

US 2004/0193854 A1    Sep. 30, 2004

(30) Foreign Application Priority Data

Jan. 27, 2003    (KR) ............... 10-2003-0005236

(51) Int. Cl.
*G06F 9/30* (2006.01)
(52) U.S. Cl. .................................... 712/205
(58) Field of Classification Search ............ 712/205
See application file for complete search history.

(56) References Cited

U.S. PATENT DOCUMENTS 6,073,159 A * 6/2000 Emer et al. ............... 718/103
6,076,157 A * 6/2000 Borkenhagen et al. ..... 712/228
6,470,443 B1   10/2002 Emer et al.
6,658,447 B2 * 12/2003 Cota-Robles ............... 718/103

OTHER PUBLICATIONS

"Exploiting Choice: Instruction Fetch and Issue on an Implementable Simultaneous Multithreading Processor"; Tullsen et al; 1996.*
"Balancing Throughput and Fairness in SMT Processors"; Luo et al; 2001; IEEE.*
"Front-End Policies for Improved Issue Efficiency in SMT Processors"; Ali El-Moursy and David Albonesi; 2002; IEEE.*
Korean Offfice Action, dated Dec. 7, 2004, with English translation.

* cited by examiner

*Primary Examiner*—Donald Sparks
*Assistant Examiner*—Benjamin P. Geib
(74) *Attorney, Agent, or Firm*—Harness, Dickey & Pierce, P.L.C.

(57) ABSTRACT

A simultaneous multithreading processor determines, for each thread, the processing time occupied by each thread in the processing pipeline of the processor. Based on the determined processing times, a fetch unit in the processing pipeline determines the thread from which to fetch the next instruction.

21 Claims, 3 Drawing Sheets

THREAD SELECTION FOR FETCHING INSTRUCTIONS FOR PIPELINE MULTI-THREADED PROCESSOR

BACKGROUND OF THE INVENTION

This application claims the priority of Korean Patent Application No. 2003-5236, filed on Jan. 27, 2003, in the Korean Intellectual Property Office, the disclosure of which is incorporated herein in its entirety by reference.

FIELD OF THE INVENTION

Exemplary Embodiments of the present invention relate to a central processing unit (CPU), and more particularly, to a simultaneous multithreading (SMT) processor of a computer system.

DESCRIPTION OF THE RELATED ART

A CPU can either be scalar, issuing a single instruction each clock cycle, or superscalar, issuing multiple instructions in parallel each clock cycle to improve the performance of the CPU. Nevertheless, an inexecutable-instruction period in a superscalar CPU, i.e., a waste period, may occur due to data dependency.

Simultaneous multithreading (SMT) allows a plurality of threads to simultaneously exist for a clock cycle and instructions of each of the plurality of threads to be simultaneously executed. A thread may be generally defined as a distinct point of control within a process, a distinct execution path through a process, or a distinct program. Through context switching, the CPU switches between these threads, allocating system resources to each thread in turn, in order to improve the rate of instruction throughput. The higher rate of instruction throughput is achieved by providing higher utilization of the various functional units by taking advantage of the independence of the instructions from the various threads. In simultaneous multithreading, instructions from multiple threads are executed during each cycle, dynamically sharing system resources and further improving instruction throughput. Namely, SMT allows instructions to be executed even during a waste period of a thread to reduce the effect of the waste period, which results in improved performance of the CPU.

U.S. Pat. No. 6,470,443 describes such a SMT processor, and several multi-threading techniques. As explained in the '443 patent, a SMT processor typically includes a fetch unit fetching a next instruction or group of instructions for one or more threads from an instruction cache; an instruction decoder decoding the cached instructions to obtain the operation type and logical address or addresses associated with the operation type of each cached instruction; a register renamer converting the logical address or addresses into real address or addresses of registers in an execution unit; an instruction queue storing the decoded instructions and real addresses; and an execution unit for executing instructions taken from the instruction queue. The execution unit includes function units for performing the function or operation of an instruction taken from the instruction queue and includes registers for storing the operands to perform the function and for storing results from performing the operation. The registers store this information in accordance with the real address or addresses generated by the register renamer.

The '443 patent describes several techniques by which the SMT processor determines from which thread the fetch unit should fetch the next instruction. These techniques are referred to a BRCOUNT, MISSCOUNT, ECOUNT, ICOUNT and IQPOSN. Under the BRCOUNT scheme, highest priority is given to those threads which are least likely to suffer from a branch mispredict, that is, those threads which are least likely to execute on a wrong path. Under the MISSCOUNT scheme, highest priority is given to those threads which have the fewest outstanding data cache misses. This scheme addresses a problem which arises during long memory latencies which cause dependent instructions to back up in the instruction queue waiting for a load to complete. Eventually, these dependent instructions fill the instruction queue with instructions from a single blocked thread, causing what is typically referred to as instruction queue clog. Under the ICOUNT scheme, priority is given to threads with the fewest instructions in the decode stage, the rename stage and the queue stage. This scheme provides a general solution to the instruction queue becoming clogged with instructions from a blocked thread. Under the ECOUNT scheme, priority is given to threads with the fewest instructions in the fetch stage, decode stage, rename stage, queue stage, register read stage, execute stage and the commit stage. Under the IQPOSN scheme, lowest priority is given to those threads with instructions closest to the head of the instruction queue. The instructions closest to the head of the instruction queue are the oldest instructions. Threads with the oldest instructions are most prone to instruction queue clog. Accordingly, it is most beneficial to select for fetch those threads with instructions furthest from the head of the queue.

As will be appreciated from the '443 patent, the techniques for fetching instructions in the conventional SMT processor usually use some type of instruction count without considering an operation cycle count of the instructions, which substantially affects latency. This deteriorates the performance of the CPU. For example, assume under the ICOUNT scheme that a thread A has two multiplication instructions, each with an operation cycle count of 3, and a thread B has four addition instructions, each with an operation cycle count of 1. In this example, the execution time of thread A is longer than that of thread B. In other words, although thread A has a smaller number of instructions and gets priority over thread B according to the ICOUNT scheme, thread A ends up waiting in an instruction queue for a longer period because of the longer total operation cycle count. This may cause a queue clog, which detrimentally affects CPU performance.

SUMMARY OF EXEMPLARY EMBODIMENTS THE INVENTION

The exemplary embodiments of the present invention provide a multi-threaded processor and method that consider the processing time as well as the instruction count for each thread in deciding from which thread to fetch the next instruction.

In one exemplary embodiment, the fetch unit of the processing pipeline determines the processing time of the processing pipeline occupied by each thread. The fetch unit then determines from which thread to fetch the next instruction using these determined processing times. For example, in one embodiment, the thread having the smallest associated processing time is selected. In one exemplary embodiment, the processing time of the processing pipeline occupied by each thread is determined by generating a weighted instruction count for each thread as the determined processing time of each thread. The weighted instruction count for a thread is a count of the instructions for the thread in the processing pipeline with each instruction weighted by the cycle counts associated with processing the instruction. For example, in one exemplary embodiment, the fetch unit includes a counter associated with each thread, and each counter is increment by the cycle counts associated with each instruction in the processing pipeline and is decremented by the cycle counts associated with each instruction leaving the processing pipeline.

In the above described embodiments, the fetch unit makes the described determinations based on information received from at least one other stage in the processing pipeline. For example, in one exemplary embodiment, the received information includes the operation type of instructions in the processing pipeline, and the operation type of instructions leaving the processing pipeline. In this example, the received information is information fed back from, for example, the instruction decoder and the instruction queue in the processing pipeline.

BRIEF DESCRIPTION OF THE DRAWINGS

The above and other features and advantages of the exemplary embodiments of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
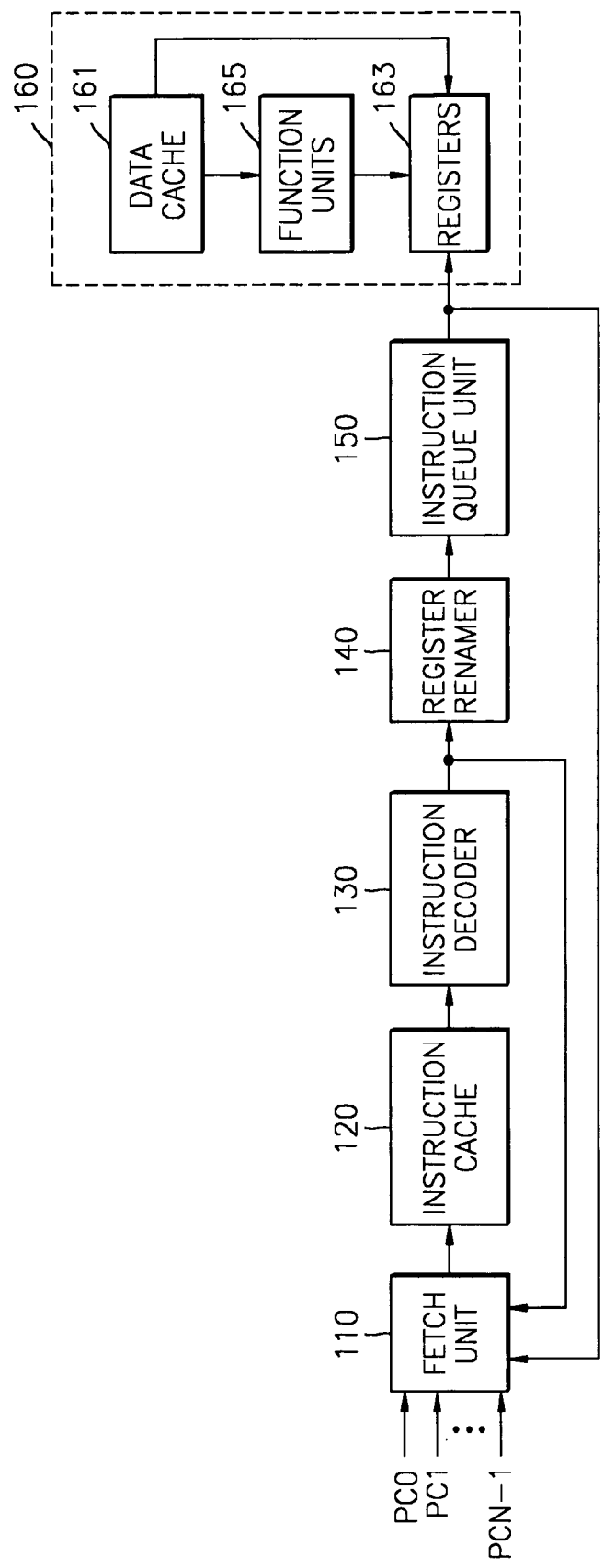
FIG. 1 is a block diagram of a simultaneous multithreading (SMT) processor according to an exemplary embodiment of the present invention.

Hereinafter, the exemplary embodiments of the present invention will be described in detail by explaining exemplary embodiments thereof with reference to the attached drawings. Like reference numerals denote like members throughout the drawings.

FIG. 1 is a block diagram of a simultaneous multithreading SMT processor according to an exemplary embodiment of the present invention. Referring to FIG. 1, the SMT processor includes a fetch unit 110, an instruction cache 120, an instruction decoder 130, a register renamer 140, an instruction queue unit 150, and an execution unit 160. The execution unit 160 includes a data cache 161, registers 163 and function units 165. The operations of these elements are substantially the same as in a conventional SMT processor such as described in U.S. Pat. No. 6,470,443, the contents of which are hereby incorporated by reference in their entirety. Accordingly, only the differences from the conventional SMT processor will be described in detail below.

The fetch unit 110 receives addresses PC0, PC1, ..., PCN−1 from a plurality of program counters (not shown). Typically, a program counter is assigned to each thread, and the count value generated thereby provides the address for the next instruction to fetch in the associated thread for execution. Based on information fed back from the instruction decoder 130 and the instruction queue unit 150, the fetch unit 110 selects one of the program addresses as the fetch address. The fetch address identifies an instruction or group of instructions from a thread based on the fetch address. Hereinafter, the structure and operation of the present invention will be described with respect to fetching a single instruction, but one skilled in the art will appreciate that more than one instruction may be fetched at a time. The structure and operation of the fetch unit 110 will be described in detail below with respect to FIG. 2.

Instructions for each thread are stored in the instruction cache 120. More specifically, at least the instruction associated with each address provided by the program counters is stored in the instruction cache 120. The instruction cache 120 passes the instruction associated with the fetch address to the instruction decoder 130. The instruction decoder 130 interprets the fetched instruction to determine the operation type and logical address or addresses of the registers 163 to store information (e.g., operands, etc.) associated with executing the fetched instruction. This decoder information (e.g., operation type, logical address or address) is fed back to the fetch unit 110.

The register renamer 140 maps the logical address or address to real, available addresses of the registers 163. As is well-known, this type of logical-to-real address mapping removes data dependencies and provides a virtual larger number of registers than actually present.

Once the instructions from the different threads are redefined to operate on distinct physical registers, the instructions from the different threads are stored in the instruction queue unit 150 The instructions are held in the instruction queue unit 150 until issued to the execution unit 160. Namely, as the operands of each instruction become available, the instructions are issued out-of-order to the appropriate function unit 165. The function units 165 are blocks, such as an adder, a multiplier, a shifter, an accumulator, as non-limiting examples, which perform basic operations.

An operand becomes available when stored in the registers 163 at the real address determined by the register renamer 140. The registers 163 may also include, as non-limiting examples, a register to be used as an operand in the execution of the issued instruction, a temporary storage register used during an operation, a destination register to store operation results, etc.

The data cache 161 stores data to be used for operations. The data may be source data or temporary data necessary for operations. The source data or temporary necessary may be stored in an internal cache memory or similar memory device to improve an operation speed. While the operands may be retrieved from the data cache 161, they may also be generated as the result of executing another instruction.

When an instruction is issued to the execution unit 160, this information (referred to as instruction issue information) is fed back to the fetch unit 110.

Figure 2:
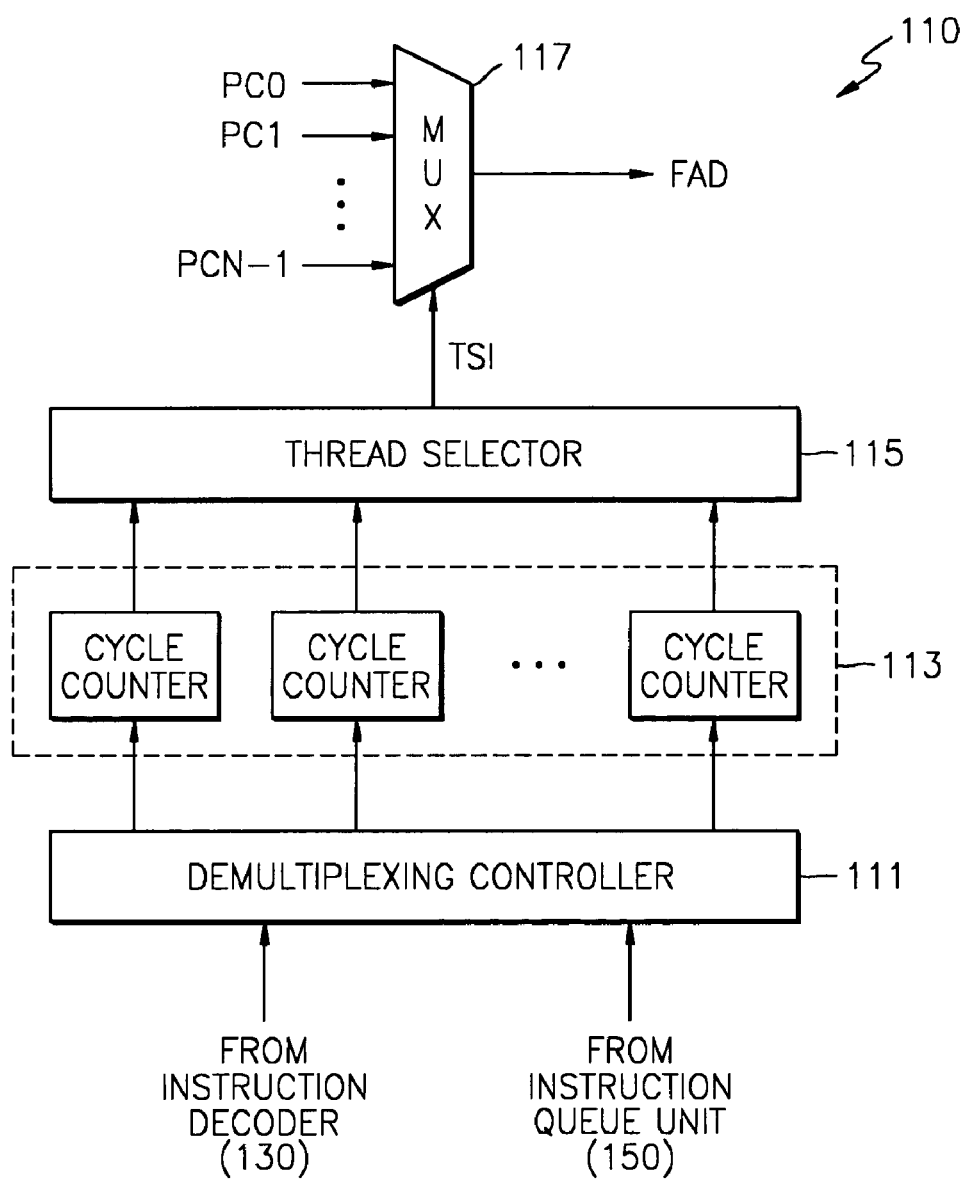
FIG. 2 is a detailed block diagram of a fetch unit of FIG. 1.

FIG. 2 is a detailed block diagram of the fetch unit 110 of FIG. 1. Referring to FIG. 2, the fetch unit 10 may include a demultiplexing controller 111, cycle counters 113, a thread selector 115, and a multiplexer 117.

The demultiplexing controller 111 receives the decoder information for each decoded instruction. From the decoder information, the demultiplexing controller 111 determines the thread to which the decoded instruction belongs (e.g., from the operation type, from an instruction identifier, etc.). For each thread, the demultiplexing controller 111 assigns one of the cycle counters 113. When first assigned, the cycle counter 113 is reset or cleared to zero. When decoder information is received for an instruction of a thread, the demultiplexing controller 111 increments the cycle counter 113 associated with the thread by an amount corresponding to the number of cycle counts for processing the decoded instruction. Cycle counts refer to cycle count values of system clocks used by at least one of the instruction decoder 130, the register renamer 140, and the instruction queue unit 150, as non-limiting examples in processing the instruction. As explained previously, different operation types require different cycle counts of time to process. For example, a multiplication operation takes more cycle counts to process than an addition operation. Accordingly, the demultiplexing controller 111 uses the operation type of the decoded instruction to determine the number by which to increment the cycle counter. Stated another way, the demultiplexing controller respectively weights the number of instructions being processed for each thread by the operation cycle count associated with each instruction to generate weighted instruction counts for each thread that represent the processing time of the processing pipeline of the SMT processor occupied by each thread.

The demultiplexing controller 111 also receives the issued instruction information. From the issued instruction information, the demultiplexing controller identifies the thread to which the decoded instruction belongs (e.g., from the operation type, from an instruction identifier, etc.). When issued instruction information is received for an instruction of a thread, the demultiplexing controller 111 decrements the cycle counter 113 associated with the thread by an amount corresponding to the number of cycle counts for processing the decoded instruction. In this embodiment, the issued instructions are considered to be leaving the processing pipeline of the SMT processor; and therefore, no longer occupying processing time of the processing pipeline. However, the present invention should not be construed as limited to this example. Instead, in alternative embodiments, the processing pipeline may include further downstream elements such as the execution unit. In these alternative embodiments, information on instructions leaving the processing pipeline would be fed back from the further included units in addition to or instead of on the issued instruction information.

In this manner, each cycle counter 113 generates a count value representing the processing time each thread currently occupies in the processing pipeline of the SMT processor. The thread selector 115 determines which of the cycle counters 113 indicates the smallest number and outputs thread selection information TSI corresponding to the determination result. Namely, the thread selector 115 determines which thread occupies the least amount of processing time in the processing pipeline of the SMT processor.

The multiplexer 117 receives the program count values from each of the program counters PC0 through PCN−1, and selectively outputs the program count value of the thread indicated by the thread selection information TSI as the fetched address.

Figure 3:
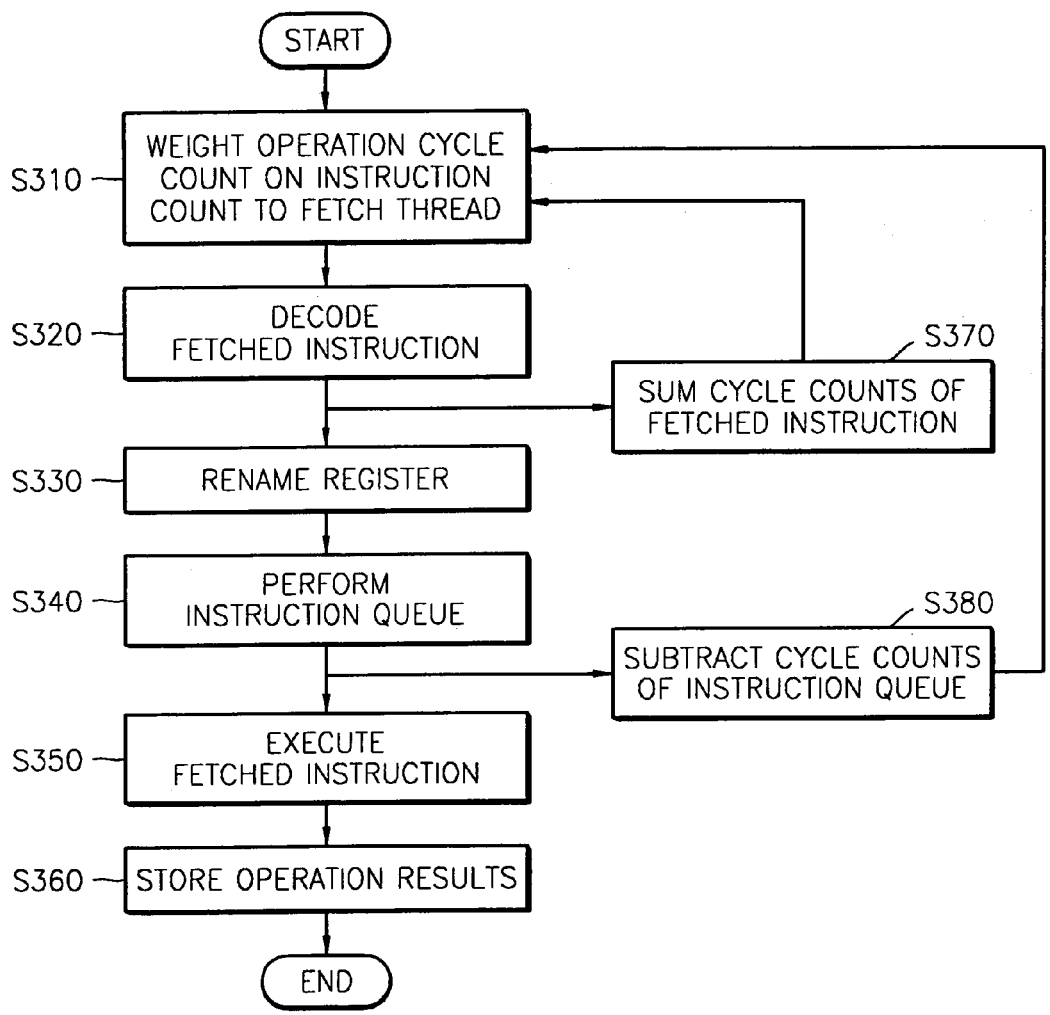
FIG. 3 is a flowchart for explaining an operation of the SMT processor of FIG. 1.

FIG. 3 illustrates a flowchart for explaining the operation of the SMT processor of FIG. 1. Referring to FIG. 3, in step S310, the fetch unit 110 generates weighted instruction counts for each thread based on the decoder information and instruction issue information fed back from the instruction decoder 130 and the instruction queue unit 150 as described in detail above with respect to FIG. 2. The fetch unit 110 selects the thread having a smallest weighted instruction count, and fetches an address from the one of the program counters associated with the selected thread.

Next, the instruction cache 120 passes the instruction at the fetched address to the instruction decoder 130, and the instruction decoder 130 decodes the instruction in step S320. The generated decoder information is fed back to fetch unit 110 in step S370. In step S330, the register renamer 140 renames the logical addresses generated by the instruction decoder 130 for the decoded instruction as real or actual register address.

Then, in step S340, the decoded instructions are stored in the instruction queue unit 150, which issues the instructions to the execution unit 160 as the data and the resources for executing the instruction become available in the execution unit 160. In step S380, the issued instruction information is fed back to the fetch unit 110.

In step S350, the execution unit 160 executes the issued instructions, and in step S360, operation results obtained from execution of the issued instructions are stored in a destination register.

As described above, in the SMT processor according to exemplary embodiments of the present invention, the fetch unit 110 may select a thread using weighted instruction counts for each thread, which represent the processing time of the processing pipeline of the SMT processor occupied by each thread. Thus, the performance of the SMT processor may be improved. As a result, the performance of a system such as, a CPU can be improved.

While exemplary embodiments of the present invention have been particularly shown and described with reference to exemplary embodiments thereof, it will be understood by those of ordinary skill in the art that various changes in form and details may be made therein without departing from the spirit and scope of the present invention.

What is claimed is:

1. A multi-threaded processor, comprising:
   a processing pipeline including a number of stages, each stage processing at least one instruction, each instruction belonging to one of a plurality of threads; and
   a fetch unit forming one of the stages of the pipeline and determining from which of the plurality of threads to fetch an instruction for processing by the processing pipeline, the fetch unit receiving information from at least one other stage of the processing pipeline and determining a processing time of the processing pipeline occupied by each of the plurality of threads based on the received information, the fetch unit determining from which of the plurality of threads to fetch the instruction for processing by the processing pipeline based on the determined processing time for each of the plurality of threads, wherein the fetch unit generates a weighted instruction count for each of the plurality of threads, the weighted instruction count for each of the plurality of threads is a count of instructions for each of the plurality of threads weighted by cycle counts associated with processing the instructions for each of the plurality of threads.

2. The processor of claim 1, wherein the fetch unit determines a smallest determined processing time thread as a thread from the plurality of threads from which to fetch an instruction for processing.

3. The processor of claim 1, wherein the received information includes operation type of instructions in the processing pipeline.

4. The processor of claim 3, wherein the received information further includes the operation type of instructions leaving the processing pipeline.

5. The processor of claim 4, wherein the fetch unit includes a counter associated with each of the plurality of threads, each counter being incremented by a processing time associated with each instruction of the associated thread in the processing pipeline and being decremented by a processing time associated with each instruction of the associated thread leaving the processing pipeline.

6. The processor of claim 5, wherein the fetch unit determines a thread associated with a counter having a smallest count value as a thread from which to fetch the instruction for processing.

7. The processor of claim 1, wherein the generated weighted instruction count for each of the plurality of threads is generated as the determined processing time of each of the plurality of threads, and the weighted instruction count for each of the plurality of threads is a count of the instructions for each of the plurality of threads in the processing pipeline.

8. The processor of claim 7, wherein the fetch unit includes a counter associated with each of the plurality of threads, each counter being incremented by the cycle counts associated with each instruction of the associated thread in the processing pipeline and being decremented by the cycle counts associated with each instruction of the associated thread leaving the processing pipeline.

9. The processor of claim 8, wherein the fetch unit determines a thread associated with a counter having a smallest count value as a thread from which to fetch an instruction for processing.

10. The processor of claim 1, wherein the processing pipeline comprises:
   an instruction decoder decoding instructions, which the fetch unit determines to fetch, to generate at least an operation type of an instruction as decoder information; and
   a queue storing decoded instructions and issuing the decoded instructions to an execution unit for execution.

11. The processor of claim 10, wherein the received information is the decoder information and the issued decoded instructions.

12. The processor of claim 1, wherein the processing pipeline further comprises:
   an instruction cache storing instructions, and outputting an instruction to an instruction decoder based on which instruction the fetch unit determines to fetch; and
   an address renamer mapping a logical address generated by the instruction decoder for an instruction into a real address of a memory device in an execution unit.

13. A method of fetching instructions for processing in a multi-threaded processor, comprising:
   receiving, at a fetch unit of a processing pipeline, information from at least one other stage of the processing pipeline, the processing pipeline including a number of stages, each stage processing at least one instruction, each instruction belonging to one of a plurality of threads;
   first determining a processing time of the processing pipeline occupied by each of the plurality of threads based on the received information by generating a weighted instruction count for each of the plurality of threads as the determined processing time of each of the plurality of threads, the weighted instruction count for each of the plurality of threads is a count of instructions for each of the plurality of threads weighted by cycle counts associated with processing the instructions for each of the plurality of threads;
   second determining from which of the plurality of threads to fetch an instruction for processing by the processing pipeline based on the determined processing time for each of the plurality of threads; and
   fetching an instruction for processing by the processing pipeline based on said second determining.

14. The method of claim 13, wherein the second determining step determines a thread having a smallest determined processing time as a thread from which to fetch an instruction for processing.

15. The method of claim 13, wherein the received information includes operation type of instructions in the processing pipeline.

16. The method of claim 15, wherein the received information further includes the operation type of instructions leaving, the processing pipeline.

17. The method of claim 16, wherein the first determining step comprises:
   incrementing, for each of the plurality of threads, a counter associated with each of the plurality of threads by a processing time associated with each instruction of the associated thread in the processing pipeline; and
   decrementing, for each of the plurality of threads, the counter associated with each of the plurality of threads by a processing time associated with each instruction of the associated thread leaving the processing pipeline.

18. The method of claim 17, wherein the second determining step determines a thread associated with a counter having a smallest count value as a thread from which to fetch an instruction for processing.

19. The method of claim 13, wherein the generating weighted instruction count for each of the plurality of threads is genetated as the determined processing time of each of the plurality of threads, the weighted instruction count for each of the plurality of threads is the count of the instructions for each of the plurality of threads in the processing pipeline.

20. The method of claim 19, wherein the first determining step comprises:
   incrementing, for each of the plurality of threads, a counter associated with each of the plurality of threads by cycle counts associated with each instruction of the associated thread in the processing pipeline; and
   decrementing, for each of the plurality of threads, the counter associated with each of the plurality of threads by the cycle counts associated with each instruction of the associated thread leaving the processing pipeline.

21. The method of claim 20, wherein the second determining step determines a thread associated with a counter having a smallest count value as a thread from which to fetch an instruction for processing.

* * * * *